(12) United States Patent
Mott et al.

(10) Patent No.: US 10,032,551 B2
(45) Date of Patent: Jul. 24, 2018

(54) LATCHING SOLENOID WHICH UTILIZES RESIDUAL MAGNETISM FOR THE LATCH AND A CAPACITOR WHICH IS DISCHARGED TO DEGAUSS AND RELEASE THE LATCH

(71) Applicant: BorgWarner Inc., Auburn Hills, MI (US)

(72) Inventors: Philip J. Mott, Dryden, NY (US); Miguel Raimao, Colorado Springs, CO (US)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 15/506,326

(22) PCT Filed: Aug. 13, 2015

(86) PCT No.: PCT/US2015/045025
§ 371 (c)(1),
(2) Date: Feb. 24, 2017

(87) PCT Pub. No.: WO2016/032763
PCT Pub. Date: Mar. 3, 2016

(65) Prior Publication Data
US 2017/0243686 A1      Aug. 24, 2017

Related U.S. Application Data

(60) Provisional application No. 62/041,439, filed on Aug. 25, 2014.

(51) Int. Cl.
*H01F 7/18*      (2006.01)
*H01F 7/06*      (2006.01)
(Continued)

(52) U.S. Cl.
CPC .......... *H01F 7/1811* (2013.01); *H01F 7/064* (2013.01); *H01F 7/121* (2013.01); *H01F 7/1607* (2013.01);
(Continued)

(58) Field of Classification Search
CPC ........ H01F 7/064; H01F 7/121; H01F 7/1607; H01F 7/1811; H01F 7/1816; F16K 31/0675
(Continued)

(56) References Cited

U.S. PATENT DOCUMENTS 6,463,773 B1 * 10/2002 Dimig ..................... E05B 83/36
292/201
7,738,234 B2      6/2010 Oide
(Continued)

FOREIGN PATENT DOCUMENTS

KR      20080031698 A      4/2008
KR      20080110579 A      12/2008

OTHER PUBLICATIONS

International Search Report for PCT/US2015/045025 dated Nov. 27, 2015.

*Primary Examiner* — Thienvu Tran
*Assistant Examiner* — Kevin J Comber
(74) *Attorney, Agent, or Firm* — BrooksGroup

(57) ABSTRACT

A solenoid is latched in an energized position by a residual magnetic field established by a pulse of current. A degaussing current is selectively applied from a capacitor to unlatch the solenoid. Fail-safe return to the de-energized position occurs when the supply of power is lost.

18 Claims, 1 Drawing Sheet

(51) Int. Cl.
*H01F 7/121* (2006.01)
*H01F 7/16* (2006.01)
*F16K 31/06* (2006.01)

(52) U.S. Cl.
CPC ........ *H01F 7/1816* (2013.01); *F16K 31/0675* (2013.01)

(58) Field of Classification Search
USPC .......................................................... 361/194
See application file for complete search history.

(56) References Cited

U.S. PATENT DOCUMENTS

| | | |
|---|---|---|
| 2001/0030589 A1 | 10/2001 | Dahlgren et al. |
| 2007/0076326 A1* | 4/2007 | Ito .......................... G11B 5/024 360/281.6 |
| 2007/0188967 A1 | 8/2007 | Smith et al. |
| 2009/0051472 A1 | 2/2009 | Freakes |
| 2010/0302701 A1* | 12/2010 | Olliges ................ G11B 5/0245 361/149 |
| 2012/0126753 A1* | 5/2012 | Carkner .............. H01M 10/615 320/129 |
| 2012/0261600 A1 | 10/2012 | Scripca et al. |
| 2013/0328649 A1 | 12/2013 | Robertson |

\* cited by examiner

LATCHING SOLENOID WHICH UTILIZES RESIDUAL MAGNETISM FOR THE LATCH AND A CAPACITOR WHICH IS DISCHARGED TO DEGAUSS AND RELEASE THE LATCH

CROSS-REFERENCE TO RELATED APPLICATIONS

This application claims the benefit of U.S. Provisional Application No. 62/041,439 filed Aug. 25, 2014.

TECHNICAL FIELD

The field to which the disclosure generally relates includes latching solenoids.

BACKGROUND

Solenoids that latch are used in applications where the solenoid's energized position is needed for extended periods of time. The solenoid is latched in the energized position and remains there, consuming no power, until the solenoid is unlatched.

SUMMARY OF ILLUSTRATIVE VARIATIONS

A number of variations include a solenoid with a coil selectively energized by a power supply in a selected first polarity. A capacitor is selectively charged by the power supply in the same polarity. A switch is adapted to selectively connect the capacitor to the coil in a second polarity that is the reverse of the first polarity Other illustrative variations within the scope of the invention will become apparent from the detailed description provided hereinafter. It should be understood that the detailed description and specific examples, while disclosing variations within the scope of the invention, are intended for purposes of illustration only and are not intended to limit the scope of the invention.

BRIEF DESCRIPTION OF THE DRAWINGS

Select examples of variations within the scope of the invention will become more fully understood from the detailed description and the accompanying drawings, wherein.

DETAILED DESCRIPTION OF ILLUSTRATIVE VARIATIONS

The following description of the variations is merely illustrative in nature and is in no way intended to limit the scope of the invention, its application, or uses.

Figure 1:
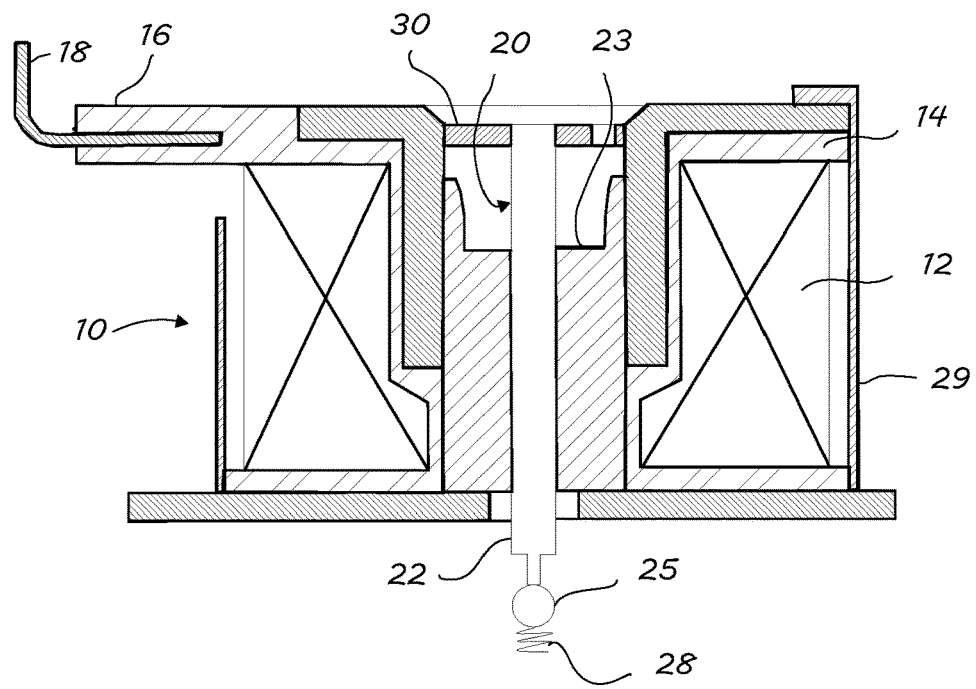
FIG. 1 is a schematic illustration of a solenoid that may be latched according to a number of variations.

Referring to FIG. 1, a number of variations may include a solenoid 10 that has a coil 12 consisting of several turns of coated wire wound around a bobbin 14. The coil assembly including the wire and bobbin form the shape of the hollow cylinder. The bobbin 14 may be made of molded plastic and includes an integral electrical connector 16 for connecting the ends of the coil's wire with a power supply through lead wires 18. Current is supplied to the solenoid valve from these wires.

An armature assembly 20 is slidably disposed inside the cylindrical coil assembly. The armature assembly may include an extending rod 22 for engaging a device such as a valve ball 25 to be actuated by the solenoid 10 and an armature body 23. When electrical current is applied to the coil assembly's winding, a magnetic field is generated around the coil assembly where the armature assembly is disposed and extends through the armature assembly 20, pole piece 24, case 29 and stop 26. In response to the magnetic field, the armature assembly slides within the center of the coil assembly, which will be downward as shown in FIG. 1.

When current is applied to coil 12 the magnetic field established through the armature assembly 20, pole piece 24, case 29 and stop 26 compresses spring 28. This moves the armature assembly 20 away from a de-energized position where armature body 23 is against plate 30, and toward stop 26 to the energized position shown in FIG. 1. When the supply of current is stopped, a residual magnetic field remains in the ferromagnetic elements of the solenoid 10 including stop 26 and armature body 23. The field holds the armature assembly in the energized position against stop 26. With no current supplied to coil assembly 12, the spring 28 is unable to force the armature assembly up away from stop 26 and toward plate 30 and the solenoid is latched. In this manner the solenoid stays in the energized position without an ongoing supply of power after actuation.

Figure 2:
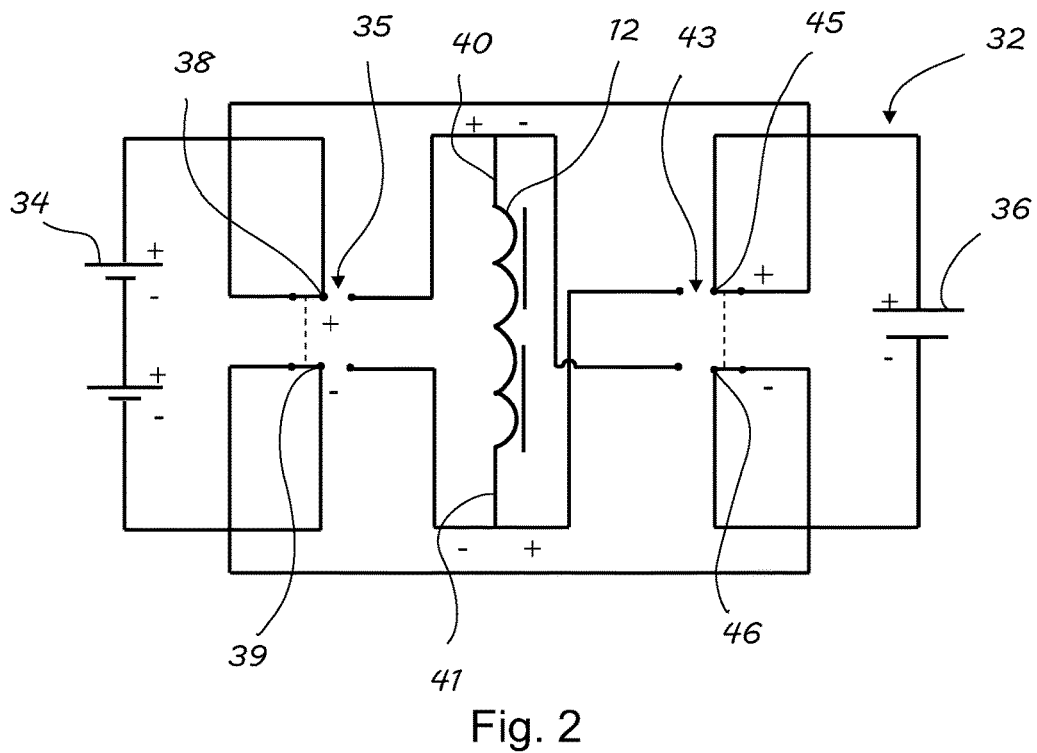
FIG. 2 is an electrical diagram for the solenoid of FIG. 1.

Referring to FIG. 2 a number of variations may include a method of releasing the armature assembly 20 from the energized position. The simplified electrical circuit 32 schematically depicts the supply of current to the solenoid coil 12. The coil's windings have an inductance of 17.6 millihenrys, and a resistance of 7 ohms. A direct current power supply 34 is selectively connected to the coil 12 through a double pole double throw switch 35. The positive pole 38 of switch 35 is selectively connectable to lead line 40 of coil 12 and the negative pole 39 of switch 35 is selectively connectable to lead line 41 of coil 12 to complete the circuit. To energize the solenoid's coil 12, the switch 35 is closed (not shown) to the coil's circuit, applying current to coil 12 and establishing a magnetic field in the ferromagnetic elements of the solenoid with a polarity to move the armature assembly 20 to an energized position. The switch may then be opened and a residual magnetic field established by the supply of current remains and holds the armature assembly 20 in the energized position with armature body 23 against stop 26.

As shown in FIG. 2, a number of variations of the electrical circuit 32 may include a capacitor 36 that is connectable to power supply 34 for charging through double pole double throw switch 43. With the switch 43 selectively closing the capacitor's circuit with the power supply 34, positive pole 45 of switch 43 is connected with the positive side of capacitor 36 and the negative pole 46 of switch 43 is connected with the negative side of capacitor 36. This charges the capacitor, which has a capacitance of 47 microfarads. Charging may be done when desired.

To release the armature assembly 20 from the energized position, the residual magnetic field must be eliminated or "degaussed." To accomplish degaussing, a current with reserve polarity may be selectively applied to the coil 12. Switch 43 may be used to connect the positive side of capacitor 36 with lead line 41 of coil 12, and to connect the negative side of capacitor 36 with the lead line 40 of coil 12. This applies current from the capacitor 32 to the coil with a polarity that is the reverse of the current applied to actuate the solenoid from the power supply 34. The reverse polarity current eliminates the residual magnetic field in the ferromagnetic elements of the solenoid, unlatching and allowing the armature assembly 20 to return to the de-energized position against plate 30. The current supplied by capacitor 32 may be slightly less than one-half the ampere's supplied by the current from the power supply 34, allowing for the use of a smaller capacitor.

Upon a loss of power in the circuit 32, switch 43 defaults to close the circuit between the capacitor 36 and the coil 12, connecting poles 45, 46 to lead lines 41, 40 respectively. This degausses the residual magnetic field and ensures the solenoid moves to the de-energized or default position with armature body 23 against plate 30. In this manner a fall-safe means of operation is provided wherein the loss of supplied current will return the solenoid to the de-energized position.

The following description of variants is only illustrative of components, elements, acts, products and methods considered to be within the scope of the invention and is not in any way intended to limit such scope by what is specifically disclosed or not expressly set forth. Components, elements, acts, products and methods may be combined and rearranged other than as expressly described herein and still are considered to be within the scope of the invention.

Variation 1 may include a solenoid having a coil selectively energized by a power supply in a first polarity. A capacitor is selectively charged by the power supply in the first polarity. A switch is adapted to selectively connect the capacitor to the coil in a second polarity that is the reverse of the first polarity.

Variation 2 may include a solenoid as stated in variation 1 wherein the solenoid includes an armature and the coil is energized to move the armature from a de-energized position to an energized position. When the coil is disconnected from the power supply the armature remains in the energized position.

Variation 3 may include a solenoid as stated in variation 2 wherein when the capacitor is connected to the coil the armature returns to the de-energized position Variation 4 may include a solenoid as stated in variation 2 or 3 wherein the power supply establishes a residual magnetic attraction when the coil is energized such that when the power supply is disconnected from the coil, the residual magnetic attraction holds the armature in the energized position.

Variation 5 may include a solenoid as stated in any of variations 1 through 4 wherein a current supplied by the capacitor is less than one-half the magnitude of a current supplied by the power supply.

Variation 6 may include a solenoid as stated in any of variations 1 through 5 wherein the power supply is connectable to energize the coil through a first switch and the power supply is connectable to charge the capacitor through the first switch.

Variation 7 may include a solenoid as stated in variation 6 wherein the capacitor is connectable to the coil through a second switch.

Variation 8 may include a solenoid having a coil with a plurality of windings through which an energizing electrical current is selectively passed. The coil generates a magnetic field when exposed to the energizing electrical current. The magnetic field moves an armature away from a de-energized position and toward a fixed stop to an energized position. The magnetic field also establishes a magnetic attraction between the armature and the stop wherein when the energizing electrical current is removed, a residual magnetic attraction created by the energizing electrical current holds the armature in the energized position until a capacitor is connected to the coil, which allows the armature to return to the de-energized position.

Variation 9 may include a solenoid as stated in variation 8 wherein the capacitor supplies a degaussing electrical current that is less than one-half the magnitude of the energizing electrical current.

Variation 10 may include a solenoid as stated in variation 8 or 9 wherein the capacitor has a capacitance of approximately 47 microfarads.

Variation 11 may include a method of holding a solenoid in an energized position and releasing the solenoid to a de-energized position. An energizing current is applied to a coil for a relatively short pulse. The pulse moves the solenoid from a de-energized position to an energized position. A residual magnetic field is established through the energizing current. The energizing current is then removed. The residual magnetic field is used to hold the solenoid in the energized position. A capacitor is charged from the power supply. A current is supplied to the coil from the capacitor releasing the solenoid to the de-energized position.

Variation 12 may include a method as stated in variation 11 including providing a fail-safe return of the solenoid to the de-energized position wherein a loss of current returns the solenoid to the de-energized position.

The above description of select variations within the scope of the invention is merely illustrative in nature and, thus, variations or variants thereof are not to be regarded as a departure from the spirit and scope of the invention.

What is claimed is:

1. A product comprising: a coil, a power supply and a first double pole double throw switch connected to the power supply and the coil to selectively energize the coil in a first polarity; a capacitor selectively charged by the power supply in the first polarity; and a second double pole double throw switch adapted to selectively connect the capacitor to the coil in a second polarity that is the reverse of the first polarity.

2. A product according to claim 1 wherein the solenoid includes an armature and the coil is energized to move the armature from a de-energized position to an energized position, wherein when the coil is disconnected from the power supply the armature remains in the energized position.

3. A product according to claim 2 wherein when the capacitor is connected to the coil the armature returns to the de-energized position.

4. A product according to claim 2 wherein the power supply establishes a residual magnetic attraction when the coil is energized such that when the power supply is disconnected from the coil, the residual magnetic attraction holds the armature in the energized position.

5. A product according to claim 1 wherein a current supplied by the capacitor is less than one-half the magnitude of a current supplied by the power supply.

6. A product according to claim 1 wherein the power supply is connectable to energize the coil through a first switch and the power supply is connectable to charge the capacitor through the first switch.

7. A product according to claim 6 wherein the capacitor is connectable to the coil through a second switch.

8. A product as set forth in claim 1 wherein the solenoid further comprises an armature comprising a rod having a ball valve at one end.

9. A product as set forth in claim 8 wherein the solenoid further comprises a spring biasing the armature.

10. A method as set forth in claim 8 wherein the solenoid further comprises a spring biasing the armature.

11. A method as set forth in claim 1 wherein the solenoid further comprises an armature comprising a rod having a ball valve at one end.

12. A product comprising a coil with a plurality of windings through which an energizing electrical current is selectively passed, the coil generating a magnetic field when exposed to the energizing electrical current, the magnetic field moving an armature away from a de-energized position and toward a fixed stop to an energized position and establishing a magnetic attraction between the armature and the stop wherein when the energizing electrical current is removed a residual magnetic attraction created by the energizing electrical current holds the armature in the energized position until a capacitor is connected to the coil, which allows the armature to return to the de-energized position, and a power supply and a first double pole double throw switch connected to the power supply and the coil, and wherein the capacitor is connected to the coil by a second double pole double throw switch.

13. A product according to claim 12 wherein the capacitor supplies a degaussing electrical current to the coil that is less than one-half the magnitude of the energizing electrical current.

14. A product according to claim 12 wherein the capacitor has a capacitance of 47 microfarads.

15. A product as set forth in claim 12 wherein the solenoid further comprises an armature comprising a rod having a ball valve at one end.

16. A product as set forth in claim 15 wherein the solenoid further comprises a spring biasing the armature.

17. A method of holding a solenoid in an energized position and releasing the solenoid to a de-energized position including the steps of: applying an energizing current to a coil for a relatively short pulse; moving the solenoid from a de-energized position to an energized position; establishing a residual magnetic field through the energizing current; removing the energizing current; utilizing the residual magnetic field to hold the solenoid in the energized position; charging a capacitor from the power supply; and applying a current to the coil from the capacitor releasing the solenoid to the de-energized position, wherein a first double pole double throw switch is connected to the power supply and the coil, and wherein the capacitor is connected to the coil by a second double pole double throw switch.

18. A method according to claim 17 including the step of providing a fail-safe return of the solenoid to the de-energized position wherein a loss of current returns the solenoid to the de-energized position.

* * * * *